UNITED STATES PATENT OFFICE.

TITUS K. CONE, OF KEARNEY, NEBRASKA.

MEDICAL COMPOUND.

SPECIFICATION forming part of Letters Patent No. 239,450, dated March 29, 1881.

Application filed December 27, 1880. (No specimens.)

*To all whom it may concern:*

Be it known that I, TITUS KING CONE, a citizen of the United States, residing at Kearney, in the county of Buffalo and State of Nebraska, have invented a new and useful composition of matter to be used as a dental anodyne in neuralgia, when neuralgia is caused by decayed teeth.

My composition consists of the following ingredients, combined in the proportions stated, viz: pure water, one-half gallon; white-oak bark, twelve ounces; hemlock-bark, one and one-third ounce; cinnamon-bark, one and one-third ounce; common tansy, one and one-third ounce. These ingredients are to be thoroughly mingled by soaking them together twenty-four hours, then heating until the boiling-point is attained. Then this liquid must be strained through a clean linen cloth, when it will be ready for use.

To use this compound take a small quantity in the mouth. Allow it to cover the diseased tooth, repeating this through the day or night, or until the pain ceases. Should there be a cavity sufficient to admit a piece of raw cotton, the cotton should be saturated with the mixture and placed in the cavity, the same being changed frequently. The above applications should be continued until all pain is subdued. Should the pain return in two or three days after the first treatment, a second treatment becomes necessary, and should be conducted the same as the first treatment. The reason that the pain returns is because there was some portion of the exposed nerve not thoroughly covered sufficiently to exclude the air and moisture. Hence the pain returns. The first cause of tooth-ache is the destruction of the natural covering, admitting air and moisture to the exposed nerves.

By the use of the above compound the exposed nerves in decayed teeth are hermetically sealed and glazed over. They are tanned, the action of my compound upon the exposed nerves in decayed teeth being very similar to the action of oak-bark ooze upon the surface of a raw beef-hide. The tansy and cinnamon possess properties which tend to allay all inflammation that may exist, and then the oak and hemlock have astringent properties which complete the cure of toothache.

The above-described medical compound does not injure the sound teeth, will not make the mouth sore, and can be used by children or delicate women, and not the least harm can possibly result from its use, even should a small quantity be accidentally swallowed. The liquid will penetrate the smallest cavity and effect a cure.

What I claim is—

The medical compound described, consisting of water, oak-bark, hemlock-bark, cinnamon-bark, and tansy, in the proportions stated.

TITUS KING CONE.

Witnesses:
WILLIAM L. PAUL,
GEORGE E. NORRIS.